May 26, 1970  H. KLASSEN ET AL  3,513,949

WHEEL, BRAKE MEMBERS AND SECURING MEANS THEREBETWEEN

Filed Feb. 28, 1969

Inventor:
HORST KLASSEN
ALFRED OTTO

By: Michael S. Striker
Attorney

United States Patent Office 3,513,949
Patented May 26, 1970

3,513,949
WHEEL, BRAKE MEMBERS AND SECURING MEANS THEREBETWEEN
Horst Klassen and Alfred Otto, Remscheid, Germany, assignors to Bergische Stahl-Industrie, Remscheid, Germany
Filed Feb. 28, 1969, Ser. No. 803,151
Int. Cl. F16d 65/12
U.S. Cl. 188—218                                    10 Claims

ABSTRACT OF THE DISCLOSURE

A wheel for rail vehicles has a wheel disk provided with circumferentially spaced axial apertures. A rim is rigid and coaxial with the wheel disk. A pair of annular brake members each overlie and abut against one of the opposite sides of the disk and have axial holes which are each aligned with and communicate with one of the axial apertures. A connecting arrangement connects the brake members with the wheel disk and includes a sleeve member received in each aperture with its opposite end portions extending into one of the holes in one of the brake members. Radial bores are provided in the brake members and each communicates with one of the holes. A recess is provided in each end portion of each sleeve member and communicates with the respectively associated radial bore, and an elongated member is received in each radial bore rigid with the respective brake member and has a leading portion lodged in the respective communicating recess of a sleeve member.

BACKGROUND OF THE INVENTION

The present invention relates to wheel constructions, and more particularly to the construction of wheels for rail vehicles. Still more particularly, the invention relates to the construction of brakeable rails for rail vehicles.

It is known to construct wheels, particularly those used in rail vehicles, of a wheel disk with which a rim is coaxial and rigidly affixed. Annular brake members are respectively secured to the opposite sides of the wheel disk and engage with the brake lining when the respective wheel is to be braked. According to the prior art, bores are provided in these brake members for the purpose of receiving elements which affix them to the wheel disk. Because of these openings which the presence of these openings in the faces of the brake members which come into contact with the brake lining may in certain circumstances resulting in increased wear of the brake lining, and also in possible damage to the contact face of the brake lining. It need not be emphasized that this is disadvantageous, just as the manner of affixing the brake members to the wheel disk as it is known from the prior art is rather complicated and in need of simplification.

Accordingly the present invention has as its object to provide a wheel construction of the type under discussion which is not possessed of the aforementioned disadvantages.

A more particular object of the present invention is to provide such a wheel construction wherein the affixing of the annular brake members to the wheel disk is greatly simplified.

An additional object of the invention is to provide such a wheel construction wherein the possibility of increased wear and/or damage to the brake linings contacting the brake members is eliminated or at least reduced to an absolute minimum,

SUMMARY OF THE INVENTION

Pursuant to the above objects, and others which will become apparent hereafter, one feature of our invention resides in the provision of a wheel, particularly a wheel for rail vehicles, wherein a wheel disk has opposite sides and is provided with circumferenially spaced axial apertures. A rim is coaxial with and connected to the wheel disk. A pair of annular brake members respectively overlies and abuts against one of the opposite sides of the wheel disk and has axial holes each of which is aligned and communicates with one of the axial apertures in the disk. Finally, we provide connecting means connecting the brake members with the wheel disk and comprising, in accordance with our invention, a sleeve member in each of the apertures and projecting with its opposite end portions into one of the holes lined with the respective aperture. Radial bores are provided in the brake members and each communicates with one of these holes. A recess is provided in each end portion of each sleeve member and an elongated member is received in each radial bore rigid with the respective brake member, with a leading portion of each elongated member being lodged in the respective recess of one of the sleeve members.

By this construction, which may utilize screws, bolts, pins or the like for the elongated members received in the radial bores, we provide for a brakeable wheel wherein the holes provided in the annular brake members are not open at those faces of the annular brake members which contact the brake lining when the wheel is being braked. Furthermore, the connection of the annular brake members with the wheel disk is considerably simplified.

Our invention also encompasses the possibility of constructing the wheel in such a manner that the connecting means will provide a snap-action type of connection between the brake members and the wheel disk which further simplifies the assembly of the various parts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2, 3:
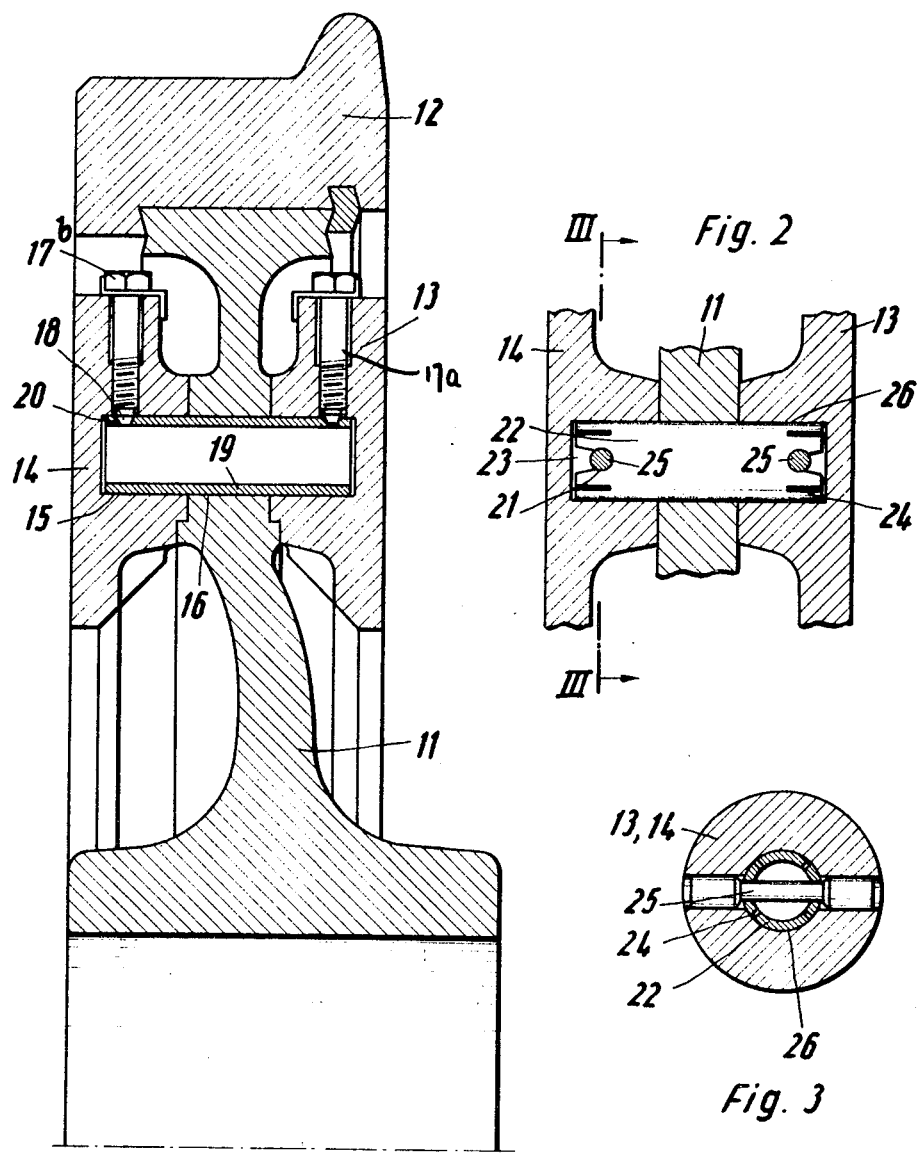
FIG. 1 is a fragmentary axial section through a wheel embodying our invention.
FIG. 2 is a fragmentary sectional detail view of another embodiment of our invention.
FIG. 3 is a section taken on the line III—III of FIG. 2.

Discussing firstly the embodiment illustrated in FIG. 1 it will be seen that this is a fragmentary axial section through a wheel for rail vehicles. The conventional hub of such wheels has been omitted as not essential to an understanding of the invention, but it will be appreciated that the wheel disk 11 surrounds and is coaxial with such a hub in known manner. It follows from this that the wheel disk 11 includes another portion which is not illustrated but which is mirror-symmetrical with respect to the one shown in FIG. 1. The invention, however, can readily be understood from the portion of the wheel shown in the drawing.

An annular rim 12 surrounds and is coaxial with the wheel disk 11, and is rigidly secured thereto, for instance in the conventional manner by being press-fitted thereon.

The wheel disk 11 is provided with a plurality of circumferentially spaced apertures 16 extending axially therethrough. A pair of annular brake members 13 overlie and abut against the opposite axial sides of the wheel disk 11, as ilustrated in FIG. 1. Each of the brake members 13 is provided with a plurality of axial holes 15 which are arranged in correspondence with the apertures 16 in the wheels 11. These holes 15, which are blind as FIG. 1 shows and thus do not penetrate to those faces of the brake members 13 and 14 which face away from the wheel disk 11, are aligned with and in communication with respective ones of the apertures 16. Furthermore, each of the brake members 13 and 14 is provided with a plurality of radial bores 17a extending from their outer edge face inwardly and opening into one of the holes 15.

To connect the brake members 13 and 14 with the wheel disk 11, we have provided connecting means which includes a plurality of sleeve members 19 which are each received in one of the apertures 16 with its opposite end portions extending into the respectively communicating holes 15 of the brake members 13 and 14. This is illustrated in FIG. 1 from which it will also be clear that each end portion of each of the sleeve members 19 is provided in its circumference with a recess 20 which is aligned with the inner end of one of the radial bores 17a.

In the embodiment of FIG. 1 a screw-threaded elongated member 17b, such as a screw, bolt or the like, is received in each of the bores 17a, and extends with its leading end portion 18 into one of the recesses 20 of the associated sleeve member 19. Of course, the bores 17a in this case are provided with internal screw threads meshing with external screw threads on the members 17b. Advantageously the leading portions 18 of the members 17b are tapered, for instance frustoconically, and the recesses 20 are provided with a complementarily tapered cross section.

In assembling the wheel illustrated in FIG. 1, the sleeve members 19 of which only one is shown but of which there may be a requisite number whose determination is simple to the person skilled in the art, is inserted into the respective apertures 16 with their end portions extending axially beyond the opposite sides of the wheel disk 11. Thereupon, the brake members 13 and 14 are pushed onto the projecting end portions of the respective sleeve members 19, so that these end portions are each received in one of the holes 15 provided in the brake members 13 and 14, respectively. The screws or analogous members 17b have previously been inserted into the radial bores 17a and are now tightened until their leading portions 18 are seated in the respective recesses 20. The tolerances in the positioning of the recesses 20 and the radial bores 17a are so selected that, when the screws 17b are tightened, entry of their leading portions 18 into the respective recesses 20 will result in exerting an axially inwardly directed pressure upon the respective annular brake members 13 and 14, thus pressing them into tight engagement with the opposite sides of the wheel disk 11. Suitable locking tongues or the like, which are illustrated but not identified with a reference numeral, may in known manner be provided to preclude undesired loosening of the members 17b.

The embodiment illustrated in FIGS. 2 and 3 differs somewhat from that of FIG. 1. Basically, the same elements are involved, namely a wheel disk 11, a rim 12 and the annular brake members 13 and 14. Because it is not essential to an understanding of this embodiment, the rim 12 has been omitted and only a portion of the wheel disk 11 has been illustrated.

In the embodiment of FIGS. 2 and 3 the holes in the annular brake members 13 and 14 are identified with reference numeral 26 and are traversed by radially extending pins 25 whose end portions are secured in the radial bores while communicating with the respective holes 26, as seen in FIG. 3. Unlike the embodiment of FIG. 1, the sleeve members 22 utilized in the embodiment of FIGS. 2 and 3 are provided with recesses 21 extending transversely of the elongation of the respective sleeve member 22 and penetrating the circumferential wall thereof at diametrically opposite locations. From the respective ends of the sleeve members 22 notches or incisions extend inwardly to the recesses 21 with which they communicate. These notches 23 converge in the direction towards the respective recess 21. The diameter of those portions of the pins 25 located within the respective hole 26 corresponds to the diameter of the recesses 21. To facilitate elastic deformation of the material of the sleeve members 22, one or more additional slots or incisions 24 may be provided at one or both opposite sides of the notches 23 and extending in axial direction of the respective sleeve member 22.

In assembly of the embodiment illustrated in FIGS 2 and 3, the pins 25 are secured in the holes 26 in the respective brake members 13 and 14. The sleeve members 22 are inserted into their respective apertures 16 of the wheel disk 11, and thereupon the brake members 13 and 14 are positioned so that the projecting end portions of the sleeve members 22 are each aligned with one of the holes 26 in one of the brake members 13 and 14. Pressing the brake members 13 and 14 inwardly towards the wheel disk 11 will now result in snapping of the pins 25 into the recesses 21, into which they have been guided by the converging notches 23. The provision of the slots or incisions 24 facilitates this snap-action type of connection because it permits the material of the sleeve members 22 to yield more readily when the pins 25 are thus forced into their respective associated recesses 21.

It will be appreciated that in neither embodiment do the holes in brake members 13 and 14 open at the side of the respective brake member which faces away from the wheel disk 11 and which, when the thus-constructed wheel is to be braked, contacts the brake lining. Accordingly, the embodiments illustrated herein, and analogous embodiments which may be derived by modifying the illustrated embodiments in manner evident to those skilled in the art, avoid the disadvantages set forth above with respect to known constructions of this type.

It will be understood that each of the elements described above, or two or more together, may also find a useful application in other types of constructions differing from the types described above.

While the invention has been illustrated and described as embodied in a wheel which is particularly suitable for rail vehicles, it is not intended to be limited to the details shown, since various modifications and structural changes may be made without departing in any way from the spirit of the present invention.

What is claimed is:

1. A wheel, particularly for rail vehicles, comprising a wheel disk having opposite sides and being provided with circumferentially spaced axial apertures; a rim coaxial with and connected to said wheel disc; a pair of annular brake members respectively overlying and abutting against one of said opposite sides and having blind axial holes each aligned and communicating with one of said axial apertures; and connecting means connecting said brake members with said wheel disk, said connecting means comprising a sleeve member received in each of said apertures and having opposite end portions each received in one of said holes aligned with the respective aperture, radial bores provided in said brake members and each communicating with one of said holes, a recess provided in each of said end portions and communicating with the respectively associated radial bore and an elongated member received in each of said radial bores rigid with the respective brake member and having a leading portion lodged in the respective communicating recess.

2. A wheel as defined in claim 1, said wheel disk having an axis of rotation, and said axial apertures extending in parallelism with said axis of rotation.

3. A wheel as defined in claim 1, said connecting means being constructed and arranged for permanently urging said brake members towards and into abutment with the respective side of said wheel disk.

4. A wheel as defined in claim 1, said radial bores having interior screwthreads, and said elongated members being provided with exterior screwthreads meshing with the interior screwthreads of the respective bores.

5. A wheel as defined in claim 4, and further comprising arresting means for arresting said screw-threaded elongated members against undesired turning in a sense resulting in their unthreading from said bores.

6. A wheel as defined in claim 4, said leading ends being of tapered configuration, and said recesses being of a cross-section corresponding to the tapered configuration of said leading ends.

7. A wheel as defined in claim 6, said recesses being bores.

8. A wheel as defined in claim 1, said recesses being bores penetrating the circumferential wall of the respective sleeve member, and the latter being provided in each end portion with an axial slot communicating with the respective bore and extending from the same to the respective end of the sleeve so that, with said sleeve members in place in said apertures and said elongated members in place in said bores of said brake members but with the latter spaced from the respective sides, relative movement of said brake members and wheel disk in a sense effecting abutment of the former against the respective sides of the latter, results in snap-action introduction of said leading portions into the associated recesses.

9. A wheel as defined in claim 8, said leading portions having a cross-sectional dimension substantially corresponding to that of the respectively associated recesses and larger than the cross-sectional dimension of said axial slots.

10. A wheel as defined in claim 8, and further comprising additional axial slots provided in said end portions and each proximal to the respective first-mentioned axial slot so as to enhance the elastic deformability of said end portions.

References Cited

FOREIGN PATENTS 1,258,444   1/1968   Germany.

GEORGE E. A. HALVOSA, Primary Examiner